Oct. 13, 1964 J. J. MURRAY ETAL 3,153,154

GRID CONTROLLED TRANSISTOR DEVICE

Filed Feb. 13, 1962

INVENTORS,
James J. Murray
BY John G. Truxal

S. J. Rotondi & A. J. Dupont

United States Patent Office 3,153,154
Patented Oct. 13, 1964

3,153,154

GRID CONTROLLED TRANSISTOR DEVICE

James J. Murray, 809 Hudson St., Durham, N.C., and John G. Truxal, 333 Jay St., Huntington Station, N.Y.

Filed Feb. 13, 1962, Ser. No. 176,172
2 Claims. (Cl. 307—88.5)
(Granted under Title 35, U.S. Code (1952), sec. 266)

Figure 1:
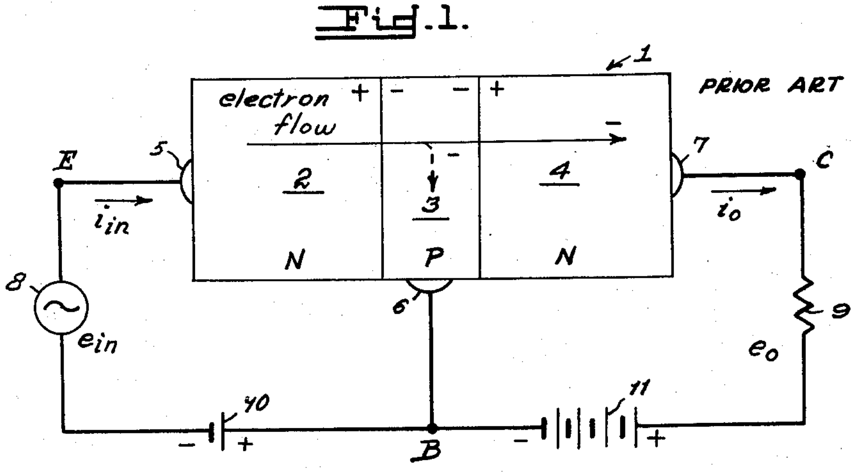

The invention described herein may be manufactured and used by or for the Government for governmental purposes without payment to us of any royalty thereon.

This invention relates to high power transfer devices and more particularly to a semi-conductor device which will provide an effective high gain, low loss amplifier at high radio frequencies.

The present art of the transistor and associated semi-conductors has developed to the stage where these devices have been able, in many cases, to substitute for the various functions performed by the electron vacuum tube. However, there still exists an area where the semi-conductor has been unable to replace certain operational characteristics of the vacuum tube, specifically the characteristics of high power transfer capability particularly at high radio frequencies.

Devices of the type disclosed in this application comprise generally a semi-conductive body having a plurality of zones of oppositive conductivity and a plurality of connections, one to each zone of the body. Each of these connections can provide a proper bias in the reverse or high impedance direction to the respective zone so that the electrical carriers, holes or electrons as the case may be, introduced at each connection flow across the barrier or junction between the appropriate zones and to the other connections with consequent current multiplication at the proper connection. Thus large current and power gains can be realized.

A well known form of the semi-conductor is the N-P-N transistor in which the electrons from the emitter (N) portion experience a potential attraction through the base (P) portion from the collector (N) portion thus giving rise to a current flow in the transistor. The N portions are sources of electrons whereas the P portion is a source of hole carriers between the two outside semi-conductor parts and furnishes essentially a dielectric for the gradient electrostatic potential difference between the two end N portions. Usually, the signal to be treated by the transistor is applied between the emitter and the base portions. Correspondingly, the electrons passing through the base portion suffer a certain amount of recombination by capture from the base material and are thereby lost to the effective current. This electron capture increases as the volume of the base is increased and as the separation distance between the barriers is also increased.

One general object of this invention is to provide a semi-conductor device which will improve, and thereby increase the field of utility of such semi-conductor amplifying devices.

A further object of this invention is to provide a device of the character described which will make it possible to achieve high power transfer capability.

Another object of this invention is to enhance power handling capabilities and increase impedance input for all forms of semi-conductors.

More specifically an object of this invention is to enable the semi-conductor to achieve the present inherent incapacity of the semi-conductor device, and to substitute for the various functions performed by the electron vacuum tube by enabling these devices to obtain a high power transfer capability by the incorporation of a novel arrangement in the grid scheme of such devices.

This device introduces a distinct novel advantage in accelerating the speed of transit and increasing the quantity of the ions between the N portions of a transistor, as well as reducing the recombination rate and also reducing the need for a thin base material.

In accordance with the present invention metallic conductors are embedded in the bulk of a semi-conductor to modify the motion of these carriers. The distribution of electrodes in the semi-conductor body may be used to control or accelerate the motion of the carriers. Application of this device will obtain additional control over the characteristics and will permit (in transistors, for example) larger base regions and hence higher power dissipation.

Figure 2:
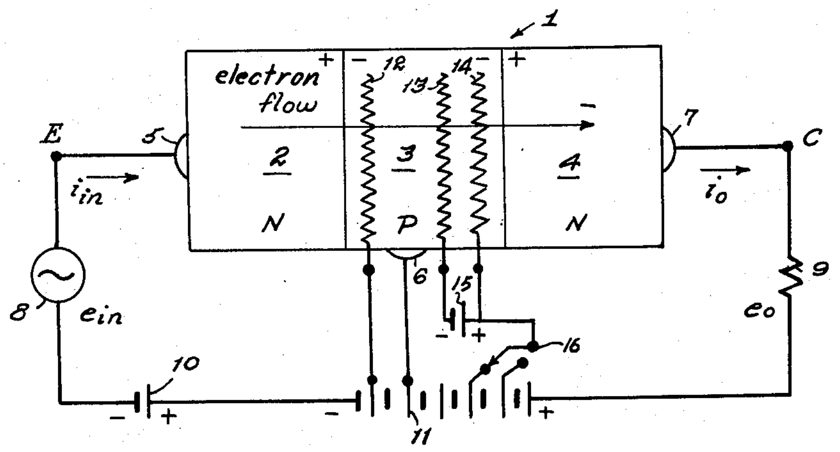

The novel features that are considered characteristic of this invention are set forth with particularity in the appended claims. The invention itself, however, both as to organization and method of operation, as well as additional objects and advantages thereof, will best be understood from the following description when read in connection with the accompanying drawing, in which:

FIGURE 1 is an example of one type of transistor arrangement showing carrier flow to collector and base used in present practice; and FIGURE 2 is an example of a grid control transistor depicting carrier flow across the base to the collector embodying the present invention.

Referring now to the drawing in which like components have been designated by the same reference numerals and particularly to FIGURE 1, there is illustrated a simple model of an N-P-N sandwich type transistor (of the usual silicon or germanium type). This conventional junction transistor has heavily doped section of N-type germanium comprising emitter 2 relative to the base 3 and this base is quite thin compared with the diffusion length of carriers in the base. The emitter-base junction is normally forward biased by means of a battery 10 of small voltage and the collector-base junction is normally reverse biased by means of a battery 11, of a large voltage. The forward-biased emitter causes a large amount of electrons to diffuse from the emitter N-region into the base P-region. If this were a simple diode the electrons entering the P-region would continue to diffuse until they reached the P-region terminal 6. A stronger possibility however, is that the electrons would wander around until they recombined with the holes of the P-region.

In the case of a triode the emitter-injected electrons will likewise continue to diffuse in a random manner. The base however is generally made much narrower than the diffusion length of the electrons and the possibility of the electrons making contact with the nearby collector-base barrier layer is fairly strong. In other words many of the electrons will traverse the base 3 and make contact with the collector 4. Once an electron touches the collector barrier, the field of the collector draws it across and keeps it there, thus providing a current at terminal 7.

If a small signal voltage from the source 8 is applied between the emitter and base terminals 5 and 6, a small signal current, $i_{in}$, will result at the emitter 2. Practically all of this input current will be collected and will appear at the collector terminal 7 in the form of an output current $i_o$. The voltage $e_o$ appearing across load resistor 9 will then be of a large magnitude due to the effect of source 11 and the transistor 1. The ideal transistor connected as shown will normally yield a current gain of unity, a large voltage gain and also a large power gain.

However, due to the recombination of the electrons in base 3 a portion of the current is drawn off through terminal 6, and as a result full unity current gain for the transistor is never achieved. This loss is undesirable, as the power gain is lowered and the transistor operates at a lower efficiency. To provide the highest possible power gain the speed of transit of the electrons must be accelerated, the quantity of electrons must be increased in the collector, and the recombination rate in the base must be reduced.

It is proposed to achieve these features desired by inserting in the base material one or more electrostatic bearing elements commonly known as grids which are normally placed in a plane perpendicular to the current as will be presently described.

FIGURE 2 shows a transistor similar to that of FIGURE 1 except for the addition of three grids 12, 13 and 14, each of which consists of a multiplicity of intersecting rods or wire-like elements defining a mesh. These grids are immersed in the P (base) material which, due to its purity, is normally a good insulator and capable therefore of insulating these grids electrically. The first grid 12 has a potential above that of the emitter 2 and thereby serves to produce a potential gradient field that accelerates the electrons to and through its mesh. Grid 14 again has a higher potential than grid 12 and further accelerates the electrons in the direction of collector 4. It is realized however that there would normally be a reverse electron current from the collector 4 through the transistor base 3 to the grids 14 and 12. To reduce this adverse feature grid 13 is introduced in which there is supplied a negative bias with respect to grid 14 by means of battery 15 and thereby produce a repulsive potential gradient to negate the particles arising in the collector 4. A switch 16 is supplied to adjust the potential on grid 14 for optimum current flow characteristics.

The large thermal capacity of the base portion which is allowable due to the enmeshed grids in the base will permit high current transfer of the electrons through the base in which the heat dissipation rate (due to larger material volume and radiating surfaces) can be significantly increased without destroying the electrical character of the transistor for radio frequency operation at high or ultra-high frequencies.

In general, in the embodiment of the invention shown and described, it will be understood that N and P zones may be interchanged, accompanied of course, by appropriate changes in the polarities of the biases. In general, the invention has provided a much needed replacement of the transistor in an area of electron vacuum tube operation.

Although a specific embodiment of this invention has been illustrated and described, it will be understood that this is but illustrative and that various modifications may be made therein without departing from the scope and spirit of this invention.

What is claimed is:

1. A junction transistor comprising a body of semiconductor material having a first and second zone of N-type germanium separated by an intermediate zone of P-type germanium, said first and second zones being contiguous with opposite faces of the intermediate zone, a first biasing means, said first biasing means forward biasing the junction formed by the said first zone and intermediate zone, a second biasing means, said second biasing means reverse biasing the junction formed by said second zone and intermediate zone, a first metallic grid embedded in said intermediate zone adjacent the junction formed by the first zone and intermediate zone, said first metallic grid coupled to said first biasing means to maintain said first metallic grid at a potential higher than the potential of said first zone, a second metallic grid embedded in said intermediate zone adjacent to the junction formed by the second zone and intermediate zone, said second metallic grid coupled to said second biasing means to maintain said second metallic grid at a potential higher than the potential of said first metallic grid, said first and second metallic grids thus arranged and biased accelerate and control carriers diffused from said first zone towards said second zone through the intermediate zone whereby said junction transistor obtains a high gain and a decrease in recombination of said carriers in the intermediate zone, and means in said intermediate zone to prevent reverse flow of said carriers from said second metallic grid to said first metallic grid.

2. The invention in accordance with claim 1 wherein said last mentioned means comprises a third metallic grid embedded in the intermediate zone adjacent the second metallic grid and biasing means for the third metallic grid providing a potential lower than the potential on the second metallic grid but of higher potential than the potential on the first metallic grid.

References Cited in the file of this patent

UNITED STATES PATENTS

| | | |
|---|---|---|
| 2,173,904 | Holst et al. | Sept. 26, 1939 |
| 2,208,455 | Glaser et al. | July 16, 1940 |
| 2,328,440 | Esseling et al. | Aug. 31, 1943 |
| 2,428,400 | Van Geel | Oct. 7, 1947 |
| 2,456,758 | Van Geel | Dec. 21, 1948 |
| 2,721,965 | Hall | Oct. 25, 1955 |